(12) United States Patent
Berlic et al.

(10) Patent No.: US 10,733,863 B2
(45) Date of Patent: Aug. 4, 2020

(54) SYSTEM AND METHOD FOR INCIDENT HANDLING

(71) Applicant: Mindmancer AB, Gothenburg (SE)

(72) Inventors: Johnny Berlic, Gothenburg (SE); Victor Hagelbäck, Gothenburg (SE)

(73) Assignee: IRISITY AB (PUBL), Gothenburg (SE)

( * ) Notice: Subject to any disclaimer, the term of this patent is extended or adjusted under 35 U.S.C. 154(b) by 257 days.

(21) Appl. No.: 15/061,032

(22) Filed: Mar. 4, 2016

(65) Prior Publication Data

US 2017/0256151 A1 Sep. 7, 2017

(30) Foreign Application Priority Data

Mar. 4, 2016 (SE) .................... 1650288

(51) Int. Cl.
| | |
|---|---|
| *G08B 13/24* | (2006.01) |
| *G08B 25/08* | (2006.01) |
| *G08B 13/196* | (2006.01) |
| *G08B 25/00* | (2006.01) |
| *H04N 7/18* | (2006.01) |
| *H04L 29/08* | (2006.01) |
| *G06Q 10/06* | (2012.01) |

(52) U.S. Cl.
CPC ... *G08B 13/2491* (2013.01); *G08B 13/19682* (2013.01); *G08B 25/001* (2013.01); *G08B 25/006* (2013.01); *G08B 25/08* (2013.01); *H04L 67/10* (2013.01); *H04N 7/18* (2013.01); *H04N 7/181* (2013.01); *G06Q 10/0631* (2013.01); *H04L 67/303* (2013.01); *H04L 67/306* (2013.01)

(58) Field of Classification Search
CPC ....... G08B 13/2491; H04N 7/18; H04L 67/10
See application file for complete search history.

(56) References Cited

U.S. PATENT DOCUMENTS

| | | | |
|---|---|---|---|
| 8,612,284 B1 * | 12/2013 | Sharif | G06F 3/067 705/400 |
| 2006/0068752 A1 | 3/2006 | Lin et al. | |
| 2010/0007731 A1 * | 1/2010 | Joseph | G08B 13/19667 348/143 |
| 2010/0077456 A1 * | 3/2010 | Drive | G08B 13/19671 726/4 |
| 2011/0242317 A1 | 10/2011 | Wengrovitz | |
| 2013/0166711 A1 | 6/2013 | Wang et al. | |

(Continued)

FOREIGN PATENT DOCUMENTS

| | | |
|---|---|---|
| CN | 102280011 A | 12/2011 |
| EP | 1973070 A1 | 9/2008 |
| WO | 2014121340 A1 | 8/2014 |

OTHER PUBLICATIONS

Ray (Effective distributed service architecture for ubiquitous video surveillance, Published online: Aug. 14, 2010, Springer Science+Business Media, LLC 2010).*

(Continued)

*Primary Examiner* — Nasim N Nirjhar
(74) *Attorney, Agent, or Firm* — RMCK Law Group, PLC

(57) ABSTRACT

The present invention relates the operation and handling of incidents, for example in relation to alarms and events generated in relation to a security system by a plurality of surveillance devices. The invention also relates to a corresponding incident handling method and a computer program product.

8 Claims, 2 Drawing Sheets

(56) References Cited

U.S. PATENT DOCUMENTS

2014/0087780 A1\* 3/2014 Abhyanker ............ H04W 4/90
                                                      455/521
2014/0132763 A1  5/2014 Billau et al.
2014/0207914 A1\* 7/2014 Robinson ................ H04L 67/10
                                                      709/219
2017/0178210 A1\* 6/2017 Gazzaz ............. G06Q 30/0611

OTHER PUBLICATIONS

International Search Report and Written Opinion for International Application No. PCT/SE2017/050173 dated Apr. 21, 2017, 15 pages.
Swedish Office Action for Application No. 1650288-2 dated Oct. 23, 2017, 9 pages.
Extended European Search Report dated Oct. 9, 2019 for EP Application No. 17760395.8, 10 pages.

\* cited by examiner

SYSTEM AND METHOD FOR INCIDENT HANDLING

CROSS REFERENCE TO RELATED APPLICATIONS

This application claims the benefit of Swedish Patent Application No. 1650288-2 filed Mar. 4, 2016. The disclosure of the above application is incorporated herein by reference in its entirety.

TECHNICAL FIELD

The present invention relates the operation and handling of incidents, for example in relation to alarms and events generated in relation to a security system by a plurality of surveillance devices. The invention also relates to a corresponding incident handling method and a computer program product.

BACKGROUND OF THE INVENTION

In conventional handling of incidents, such as alarms and/or events, for example generated by an element of a security system, such as a security camera, the indication of the incident is routed to an alarm operating center. An alarm operating center is a physical place where incident reports are handled by or on behalf of a human operator. Typically, an alarm operating center concurrently handles a considerable volume of incident reports. At the alarm operating center, each indication of an incident is queued and handled by the human operator, when a human operator is available. When no human operators are free and available to handle an indication of an incident, additional incoming incident reports are typically placed in a holding queue to await an available human operator, resulting in a waiting period that is, in comparison, longer than what is normal/desired.

Generally, once the incident is reviewed by the operator an action is taken, for example by dispatching a security officer to a scene where the incident was first reported and/or generated. To reduce clear times, it is necessary to maximize the efficient and effective use of the available officer resources and to have complete control over pending dispatches, dispatches in progress and officer status.

To cope with the complexity of different types of incidents, such as the above mentioned alarms and events, different computer systems have been proposed, facilitating the categorization of the incoming incident reports and the action to be taken, for example by the dispatched security officer. One example of such a system is disclosed in WO14121340, where a computing system is arranged to receive a plurality of surveillance feeds from a surveillance network, each of the surveillance feeds having a geospatial reference tag that identifies a corresponding surveillance location, a profiling engine that detects characteristics of the surveillance feeds that are indicative of categorized events and classifies the identified characteristics in event records, and a response module that determines a response reaction to events documented in event records using a response index allocated to corresponding event categories. Hence, WO14121340 provides some form of automation for taking the "correct" decision for handling the incident, and may in addition allow for response units in the geographical vicinity of the incident to take action as to the reported incident.

Accordingly, WO14121340 provides an interesting approach to improved handling of incidents, shortening both the time needed at the alarm operating center and the reaction time for the security officer, specifically as the security officer in the closest vicinity of the scene of the incident may be dispatched. However, in comparison to the presented computer system of WO14121340 and to other prior-art solutions, there would be desirable to provide further improvements as to handling of incidents, specifically allowing for improved scalability and use of distributed resources.

SUMMARY OF THE INVENTION

According to an aspect of the invention, the above is at least partly met by an incident handling system, comprising a server including an input module configured to receive, over a network, inputs in the form of incident reports from a plurality of geographically distributed surveillance devices configured to carry out predetermined surveillance tasks, a memory module configured to store a surveillance profile for each of the surveillance devices, and a competence profile for each of a plurality of geographically distributed users, an analysis module configured to perform a pre-processing analysis of each of the incident reports and the corresponding surveillance profiles, and a matching module configure to match a result of the pre-processing analysis and at least a portion of the competence profiles, resulting in the selection of at least one matching user, and a user interface provided on a remote communications computing device, the remote communications computing device connected to the server over the network and configured to allow manual interaction of the selected user to at least a portion of the incident report, wherein the manual interaction includes determining a response reaction to the incident report.

By means of the invention, if an incident, such as an alarm and/or an event, is identified by surveillance devices, an automated process is directly initiated for finding a matching user/human operator, from a global perspective, that may be suitable for manually reviewing information relating to the incident. Accordingly, rather than the prior-art queuing solution where the next locally available operator is presented with the incident report, the present invention applies a distributed approach where typically the skills, knowledge, and/or availability of a user/operator may be matched to the actual incident. This is in accordance to the invention achieved by performing some form of pre-processing analysis of the incident report, and matchings the result of the pre-processing analysis with the plurality of different users/operators to find an e.g. best matching user/operator.

Advantages following the proposed solution for example lie in the possibility of segmenting how an alarm/incident should be handled, for example by allowing for different type of user/operator competence to be used for manually reviewing information relating to the incident. That is, the step of manually reviewing information relating to the incident has shown to a highly desirable step for keeping a high quality of the surveillance system, and also for allowing the provision of some services where manual review of the incident is a necessity.

Thus, a surveillance profile is defined for each or a group of surveillance devices, where the surveillance profile for example may define how it is desired to handle a generated alarm/incident. The surveillance profile may possibly be defined at the time of installing the surveillance device(s) or could be updated along the line of operating the incident handling system.

As understood from the above, the invention also allows for the cost of the manual labor involved with the manual review of the incident to be a part of deciding which user/operator should reviewing the incident. It could for example be possible to allow incidents reported by some surveillance devices to be handled by low cost users/operators located remotely from the incident generating surveillance devices in e.g. low cost countries, having limited local knowledge of where/how the surveillance devices are installed. However, in some other example it may be possible to direct/match the incidents with users/operators having direct local knowledge of the site where the incident generating surveillance devices are installed. The cost involved with incident handling may accordingly be targeted towards the desire of the owner of the site where the incident generating surveillance devices are installed. In some embodiments it may also be possible for the users/operators to themselves set the price/cost for the manual review of the incident, e.g. using an auction procedure.

The invention also allows for the possibility of involving the actual availability of the users/operators to be able to handling a reported incident. Thus, the surveillance profile may be defined to direct incidents to a local user/operator, if available. However, if no local user/operator is available within a defined time span the incident may be directed to any available user/operator, thus minimizing the risk of incident being "queued-up", thereby securing a short response period from when the incident was initially reported.

The flexibility introduced by the present invention allows for a high scalability of the incident handling system, allowing users/operators on global market to connect to and handle incidents. The above mentioned auction procedure may also lower the cost relating to manual handling of incidents.

Within the context of the invention the expression "manual interaction" should be understood to mean any type of manual review of at least a portion of the incident/incident report. The incident report could for example include, and audio stream, an image or a video of the incident, and the user/operator will be instructed to manually review e.g. the audio/image/video for determining the facts of the incident. For example, the user/operator may readily understand that e.g. a surveillance device in the form of a video camera has captured an ongoing break where the surveillance device is installed. The response reaction provided by the user/operator may in such a case be to dispatch a security officer to the scene.

In a preferred embodiment of the invention, the surveillance profile for a surveillance device or a group of surveillance devices is defined with the desire to correlate the response reaction from at least two users/operators manually reviewing the incident. Thus, it may be possible to define that both of the at least two users/operators must make the same judgment of the incident before e.g. dispatching a security officer. Conversely, it may also be possible to select the "severest" response reaction (out of e.g. the two response reactions) and act accordingly.

Preferably, the incident handling system is a cloud-based computing system and the server is a cloud server. Thus, the computing power provided by means of the invention may be distributed between a plurality of servers, and the location of the servers must not be explicitly defined. Advantageous following the use of a cloud-based solution is also the inherent redundancy achieved. That is, by applying a distributed approach to the server(s) as well as to the users/operators allows for an improved security as it will typically not be possible to attach (physically or computer attack) a specified operational site where e.g. a prior-art solution would hold both servers and users/operators.

Within the context of the invention it should also be understood that the users/operators must not necessarily be certified for performing the manual review of the incident. That is, for example when applying the "correlated" approach where at least two operators are manually reviewing the incident, it may be possible to allow for a certified third user/operator to re-review all incidents where the first and the second user/operator did not make the same judgement/provided the same response reaction. Accordingly, the amount of certified manual labor needed to handling incidents may be reduced, thereby allowing for a cost reduction in handling incidents.

Furthermore, the remote communications computing device should be understood to be any type of computing device able to connect to the server. In a possible embodiment the remote communications computing device is one of a computer (laptop/stationary), a mobile phone, a tablet, etc. The hardware cost for allowing further users/operators to connect to the incident handling system is thus lowered as compared to a typical prior-art approach where it is necessary to construct a secure location where the users/operators are to review the incidents.

According to another aspect of the present invention there is provided a computer implemented method for operating an incident handling system, the incident handling system including a server and a plurality of remote communications computing device connected to the server over a network, the method comprising the steps of receiving, over the network, inputs in the form of incident reports from a plurality of geographically distributed surveillance devices configured to carry out predetermined surveillance tasks, reviewing a surveillance profile for each of the surveillance devices, and a competence profile for each of a plurality of geographically distributed users, performing a pre-processing analysis of each of the incident reports and the corresponding surveillance profiles, matching a result of the pre-processing analysis and at least a portion of the competence profiles, resulting in the selection of at least one matching user, providing at least a portion of the incident report to the at least one matching user, and receiving a response reaction from the at least one selected user based on a manual interaction of the user to the incident report provided through a user interface provided on the remote communications computing device. This aspect of the invention provides similar advantages as discussed above in relation to the previous aspect of the invention.

According to a still further aspect of the present invention there is provided a computer program product comprising a computer readable medium having stored thereon computer program means for controlling an incident handling system, wherein the incident handling system includes a server and a plurality of remote communications computing device connected to the server over a network, wherein the computer program product comprises code for receiving, over the network, inputs in the form of incident reports from a plurality of geographically distributed surveillance devices configured to carry out predetermined surveillance tasks, code for reviewing a surveillance profile for each of the surveillance devices, and a competence profile for each of a plurality of geographically distributed users, code for performing a pre-processing analysis of each of the incident reports and the corresponding surveillance profiles, code for matching a result of the pre-processing analysis and at least a portion of the competence profiles, resulting in the selection of at least one matching user, code for providing at least a portion of the incident report to the at least one matching user, and code for receiving a response reaction from the at least one selected user based on a manual interaction of the user to the incident report provided through a user interface provided on the remote communications computing device. Also this aspect of the invention provides similar advantages as discussed above in relation to the previous aspects of the invention.

A software executed by the server for operation in accordance to the invention may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
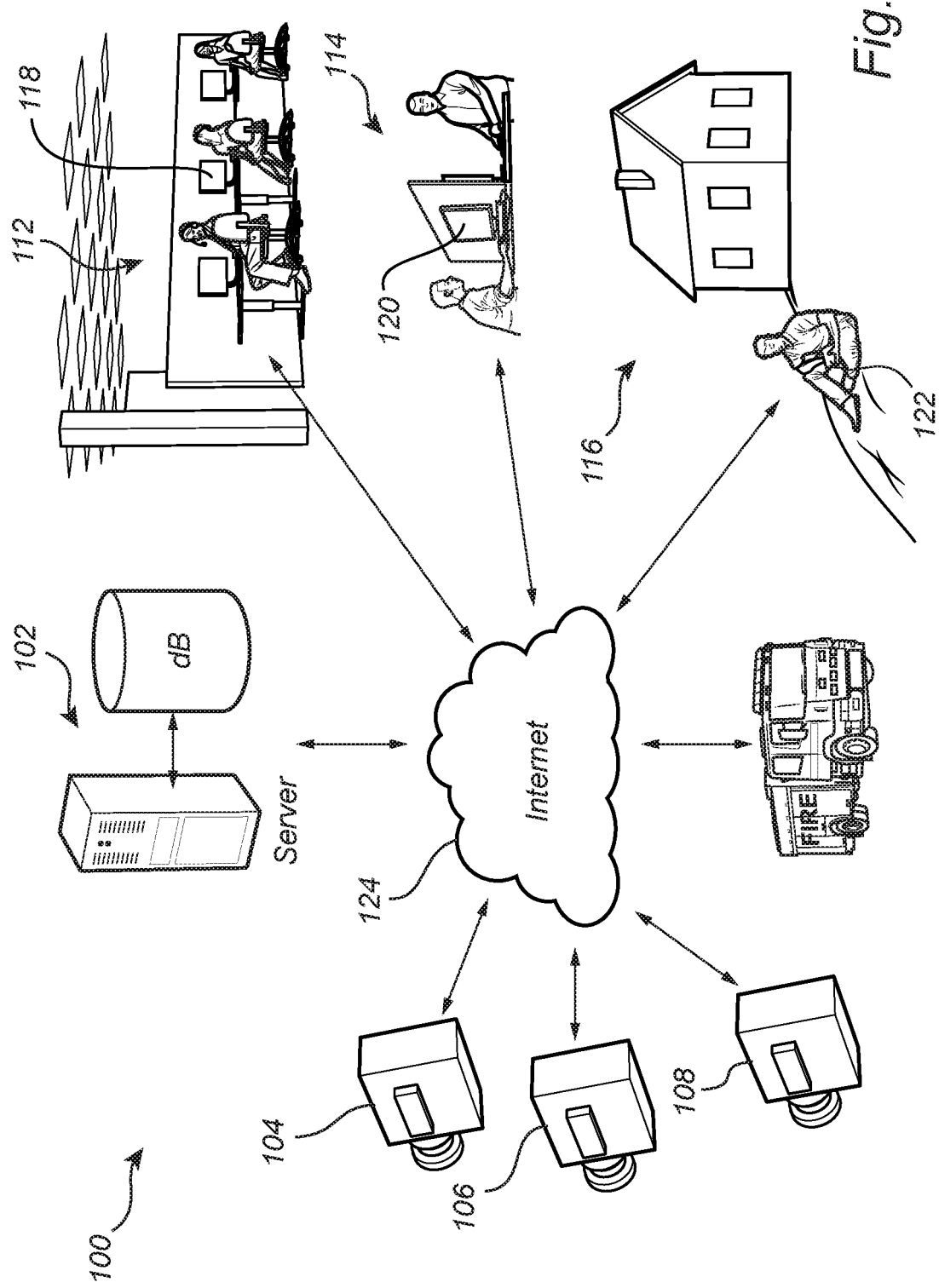
FIG. 1 illustrates an incident handling system according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted an incident handling system 100 according to a possible embodiment of the invention. The incident handling system 100 comprises at least one server and database 102, a plurality of geographically distributed surveillance devices in the form of video cameras 104, 106, 108 and a plurality of sites 110, 112, 116 comprising remote communications computing devices 118, 120, 122. The server 102, the surveillance devices 104, 106, 108 and the plurality of sites 110, 112, 116 are all connected over a network 124, such as the Internet.

The network 124 may be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar.

One or a plurality of the video cameras 104, 106, 108 are installed and arranged to monitor a specific site, such as a construction site, a building, a home, etc. Different type of surveillance devices may also be provided and connected to the server and database 102. The sites may also be geographically spaced, e.g. in different cities, countries, etc. In a corresponding manner, the plurality of sites 112, 114, 116 holding the remote communications computing devices 118, 120, 122 may be geographically spaced, e.g. in different cities, countries, etc. and may be implemented in different ways. In the illustration shown in FIG. 1, the site 112 is exemplified as a secure location (e.g. underground) where a plurality of users/operators each are handling a remote communications computing devices 118 in the form of a desktop computer. The site 114 is depicted as an office location where e.g. two or more users/operators each are handling a remote communications computing devices 120 in the form of a laptop. Finally the site 116 is shown as a location where a single user/operator is located and handles a remote communications computing devices 122 in the form of a tablet.

Figure 2:
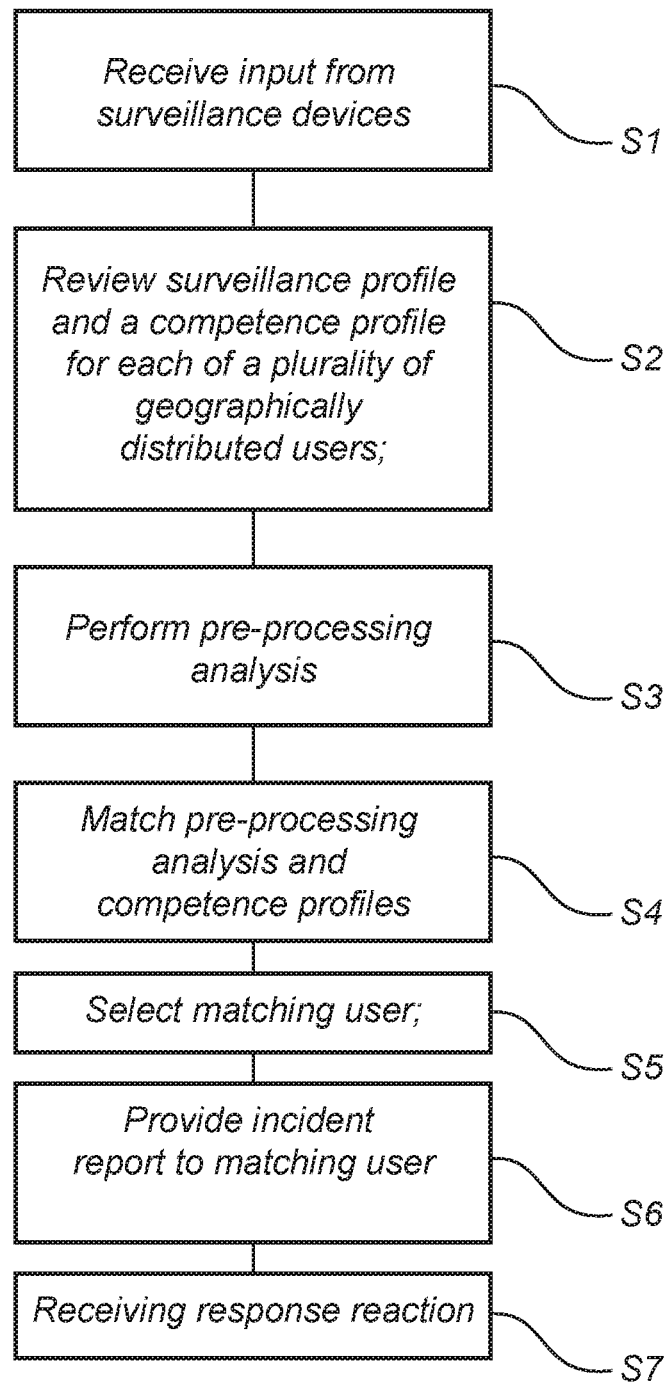
FIG. 2 shows a flow chart of a method according to an embodiment of the invention.

During operation of the incident handling system 100, with reference also to FIG. 2, e.g. video camera 104 identifies an incident and provides information relating to the incident to the server 102. The server 102 receives, S1, the information relating to the incident and access the database where a surveillance profile is stored, holding a definition of how it is desirable to handle the incident. The server 102 reviews, S2, the surveillance profile and then performs, S3, a pre-processing analysis of the incident also taking into account the related surveillance profile for the video camera 104.

As stated above, the incident report provided by the video camera 104 may for example include a video sequence. Accordingly, the pre-processing analysis may in one embodiment include providing the video sequence from the video camera 104 to a video processing module provided with the server 102, for example arranged to detect if any motion exists within the stream of captured images using image using e.g. known motion detection algorithms. The camera 104 may be an analog or digital camera and may contain varying levels of video storage and video processing capabilities, capturing a stream of images of the site where the camera 104 is installed with a frame rate (FPS) of e.g. 30 images per second. Any other frame rate is of course possible and within the scope of the invention, for example a lower frame rate may be suitable for minimizing the data generated by the distributed surveillance devices, thus minimizing the required bandwidth of the network connection.

The video processing module provided with the server 102 may be implemented as software executed by the server 102, or may be provided as a separate computing device for example including a general purpose processor, an application specific processor, a circuit containing processing components, a group of distributed processing components, a group of distributed computers configured for processing, etc. The processor may be or include any number of hardware components for conducting data or signal processing or for executing computer code stored in memory. Part of the pre-processing analysis may in some embodiment of the invention be performed at the video camera 102.

The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The result of the pre-processing analysis is the matched, S4, with the competence profiles for the plurality of potential users/operators being connected to the system 100 by means of their respective remote communications computing devices 118, 120, 122. The matching may include determining a matching level for each of the users, where the matching may take into account e.g. the direct availability of the users (expected time from reception to delivery of response reaction), language skills, geographical relation to the location of the video camera 104, cost for performing the manual review of the incident, etc. Other, further, information may also be included for determining a match between the incident and the possible user/operator to be reviewing the incident.

In a possible embodiment of the invention the site owner where the camera 104 is installed has a desire to keep the cost as low as possible for the manual labor involved in reviewing an incident reported by the video camera 104, but wants to have a low latency between an incident and a response action (e.g. less than 1 minute). Accordingly, this information has been provided in the surveillance profile for the video camera 104. Thus, when performing the matching between the incident report from the video camera 104 and the users/operators, the server 102 will search for and select, S5, of a low cost user/operator having indicated that expected time from reception to delivery of response reaction is less than or equal to 1 minute. In the exemplified embodiment, the site where the video camera 104 is installed is in Sweden, and the selected user/operator is located at an operations center 114 located in India.

The server 102 will based on the selection made provide the incident report to the selected user/human operator at the operations center 114. The incident report is in the example arranged to include a video sequence generated by the video camera 104. The selected user/human operator is accordingly provided, S6, with the video sequence, where the video sequence includes images captured at (and possibly around) the incident was detected by the video camera 104. Preferably, the video sequence is long enough for allowing the human operator to completely understand the situation at which the motion was detected, e.g. also including at least some time before that motion was detected. On the other hand, the video sequence should be kept as short as possible for maximizing the number of video sequences the human operator may view within a given time frame, thus minimizing the for determining a suitable response reaction.

In the exemplified embodiment, the video sequence generated at the video camera 104 is manually determined by the user/human operator to relate to a fire at the site where the camera 104 is installed. Accordingly, the suitable response reaction is to set up communications with a closely located fire station for dispatching a fire truck 126 to the location where the video camera 104 is installed. The response reaction is accordingly provided as an input to a user interface of the laptop 120 operated by the selected user/human operator. The user interface will format the input in a suitable manner to be received, S7 at the server 102 for further provision to the suitable fire station.

In summary, the present invention relates to an incident handling system, comprising a server including an input module configured to receive, over a network, inputs in the form of incident reports from a plurality of geographically distributed surveillance devices configured to carry out predetermined surveillance tasks, a memory module configured to store a surveillance profile for each of the surveillance devices, and a competence profile for each of a plurality of geographically distributed users, an analysis module configured to perform a pre-processing analysis of each of the incident reports and the corresponding surveillance profiles, and a matching module configure to match a result of the pre-processing analysis and at least a portion of the competence profiles, resulting in the selection of at least one matching user, and a user interface provided on a remote communications computing device, the remote communications computing device connected to the server over the network and configured to allow manual interaction of the selected user to at least a portion of the incident report, wherein the manual interaction includes determining a response reaction to the incident report.

By means of the invention, if an incident, such as an alarm and/or an event, is identified by surveillance devices, an automated process is directly initiated for finding a matching user/human operator, from a global perspective, that may be suitable for manually reviewing information relating to the incident.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:
1. A cloud based incident handling system, comprising:
a cloud server including at least one processor and a memory, wherein the cloud server is configured to:
  receive, over a network, inputs in a form of incident reports from a plurality of geographically distributed surveillance devices configured to carry out predetermined surveillance tasks, wherein the distributed surveillance devices comprise video cameras adapted to generate a video sequence to be included with the incident reports;
  store, in the memory, a surveillance profile for each of the surveillance devices and a competence profile for each of a plurality of geographically distributed users, wherein each surveillance profile defines how to handle a generated alarm/incident and each competence profile defines: (i) at least one ability, (ii) information relating to a geographical location, and (iii) a cost for performing a manual interaction with the generated alarm/incident of its corresponding user;
  perform a pre-processing analysis of each of the incident reports and the corresponding surveillance profiles; and
  match a result of the pre-processing analysis and at least a portion of the competence profiles, resulting in a selection of at least one matching user that is based at least partially on (i) the geographical location, (ii) the least one ability, (iii) the cost for performing the manual interaction with the generated alarm/incident of the users, and (iv) availability of the plurality of geographically users; and
a user interface provided on a remote communications computing device, wherein the remote communications computing device is located remotely from the cloud server, the remote communications computing device connected to the cloud server over the network and configured to allow manual interaction of the selected at least one matching user to at least a portion of the incident report, wherein the manual interaction includes determining a response reaction to the incident report,
wherein the matching of the results of the pre-processing analysis and at least the portion of the competence profiles results in the selection of at least two matching users, and the cloud server is further configured to correlate the response reactions from the at least two matching users and determining a combined response reaction.

2. The system according to claim 1, wherein the user interface is further configured to allow the selected at least one matching user to direct, through the cloud server, a physical response unit to the geographical location of the surveillance device.

3. The system according to claim 1, wherein at least a portion of the surveillance devices comprises an image sensor, and the incident report comprises at least one of an image and a video of the location of the surveillance device.

4. The system according to claim 1, wherein the plurality of geographically distributed users are geographically distributed in different countries.

5. The system according to claim 1, wherein the competence profile for the geographically distributed users comprises information relating to the current availability of each user.

6. The system according to claim 1, wherein the competence profile for the geographically distributed users comprises information relating to the language skills of each user.

7. A computer implemented method for operating an incident handling system, the incident handling system including a cloud server and a plurality of remote communications computing device connected to the cloud server over a network, the method comprising the steps of:
  receiving, over the network, inputs in a form of incident reports from a plurality of geographically distributed surveillance devices configured to carry out predetermined surveillance tasks, wherein the distributed surveillance devices comprise video cameras adapted to generate a video sequence to be included with the incident reports;
  reviewing a surveillance profile for each of the surveillance devices, and a competence profile for each of a plurality of geographically distributed users, wherein each surveillance profile defines how to handle a generated alarm/incident and each competence profile defines: (i) at least one ability, (ii) information relating to a geographical location, and (iii) a cost for performing a manual interaction with the generated alarm/incident of its corresponding user;
  performing a pre-processing analysis of each of the incident reports and the corresponding surveillance profiles;
  matching a result of the pre-processing analysis and at least a portion of the competence profiles, resulting in a selection of at least one matching geographically distributed user that is based at least partially on (i) the geographical location, (ii) the least one ability, (iii) the cost for performing the manual interaction with the generated alarm/incident of the users, and (iv) availability of the plurality of geographically users;
  providing at least a portion of the incident report to the at least one matching geographically distributed user; and
  receiving a response reaction from the at least one selected geographically distributed user based on a manual interaction of the user to the incident report provided through a user interface provided on the remote communications computing device,
  wherein the matching of the results of the pre-processing analysis and at least the portion of the competence profiles results in the selection of at least two matching users, and the cloud server is further configured to correlate the response reactions from the at least two matching users and determining a combined response reaction.

8. A computer program product comprising a non-transitory computer readable medium having stored thereon computer program means for controlling an incident handling system, wherein the incident handling system includes a cloud server and a plurality of remote communications computing device connected to the cloud server over a network, wherein the computer program product comprises:
  code for receiving, over the network, inputs in a form of incident reports from a plurality of geographically distributed surveillance devices configured to carry out predetermined surveillance tasks, wherein the distributed surveillance devices comprise video cameras adapted to generate a video sequence to be included with the incident reports;

code for reviewing a surveillance profile for each of the surveillance devices, and a competence profile for each of a plurality of geographically distributed users, wherein each surveillance profile defines how to handle a generated alarm/incident and each competence profile defines: (i) at least one ability, (ii) information relating to a geographical location, (iii) a cost for performing a manual interaction with the generated alarm/incident of its corresponding user, and (iv) availability of the plurality of geographically users;

code for performing a pre-processing analysis of each of the incident reports and the corresponding surveillance profiles;

code for matching a result of the pre-processing analysis and at least a portion of the competence profiles, resulting in a selection of at least one matching geographically distributed user that is based at least partially on (i) the geographical location, (ii) the least one ability, and (iii) the cost for performing the manual interaction with the generated alarm/incident of the users;

code for providing at least a portion of the incident report to the at least one matching user; and code for receiving a response reaction from the at least one selected geographically distributed user based on a manual interaction of the user to the incident report provided through a user interface provided on the remote communications computing device, wherein the matching of the results of the pre-processing analysis and at least the portion of the competence profiles results in the selection of at least two matching users, and the cloud server is further configured to correlate the response reactions from the at least two matching users and determining a combined response reaction.

* * * * *